United States Patent [19]

Nilssen

[11] 4,279,011
[45] Jul. 14, 1981

[54] SIMPLE, HIGH-EFFICIENCY INVERTER CIRCUITS

[76] Inventor: Ole K. Nilssen, Caesar Dr. - Rte. 4, Barrington, Ill. 60010

[21] Appl. No.: 23,849

[22] Filed: Mar. 26, 1979

[51] Int. Cl.³ .................................... H02M 7/537
[52] U.S. Cl. .................................. 363/133; 331/113 R
[58] Field of Search .................... 363/22, 97, 133; 331/113 R, 113 A, 114

[56] References Cited

U.S. PATENT DOCUMENTS

| | | | |
|---|---|---|---|
| 3,248,640 | 4/1966 | Wellford | 363/133 |
| 3,350,624 | 10/1967 | Annunziato et al. | 363/133 X |
| 3,593,109 | 7/1971 | Wellford | 331/113 A X |
| 3,662,249 | 5/1972 | Wijsboom | 331/113 A X |
| 3,781,638 | 12/1973 | Anderson et al. | 331/113 A X |
| 3,913,036 | 10/1975 | Hook | 331/113 A |
| 3,914,680 | 10/1975 | Hesler et al. | 331/113 A X |
| 4,042,855 | 8/1977 | Buenzli, Jr. | 363/133 X |

Primary Examiner—William M. Shoop
Attorney, Agent, or Firm—Dulin, Thienpont & Potthast, Ltd.

[57] ABSTRACT

A self-oscillating, push-pull inverter circuit is described wherein positive feedback signals are provided alternately to the bases of a pair of switching transistors by a single miniature saturable current transformer. The circuit performance relies on a pair of diodes having special characteristics connected across the base-emitter junctions of the respective switching transistors.

26 Claims, 10 Drawing Figures

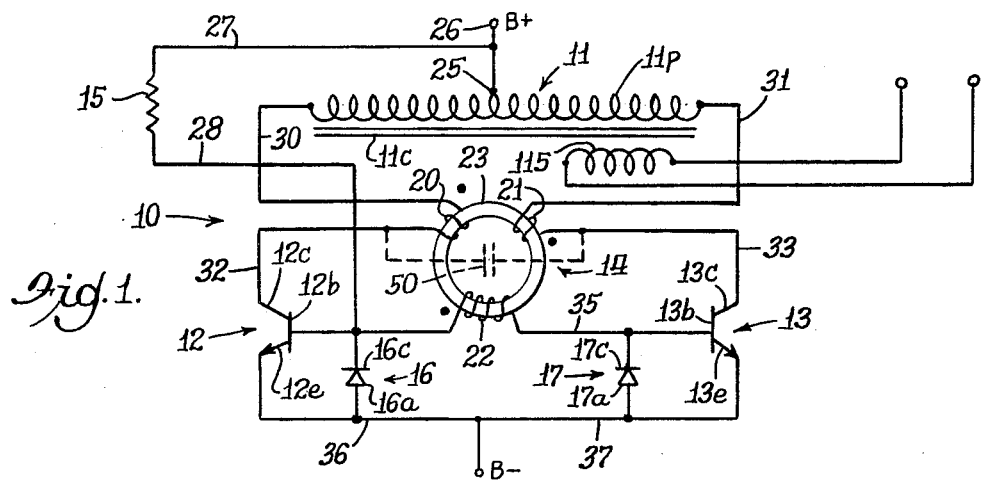
Fig. 1.
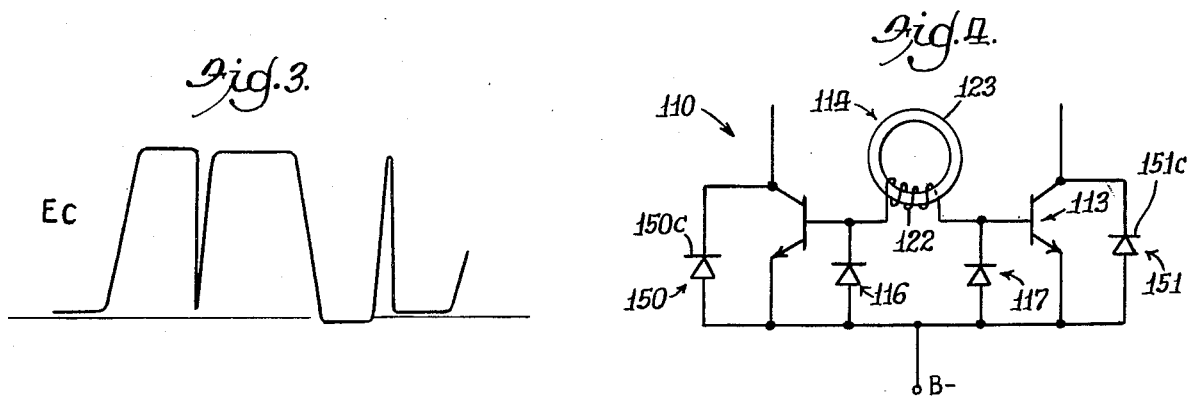
Fig. 3.
Fig. 4.
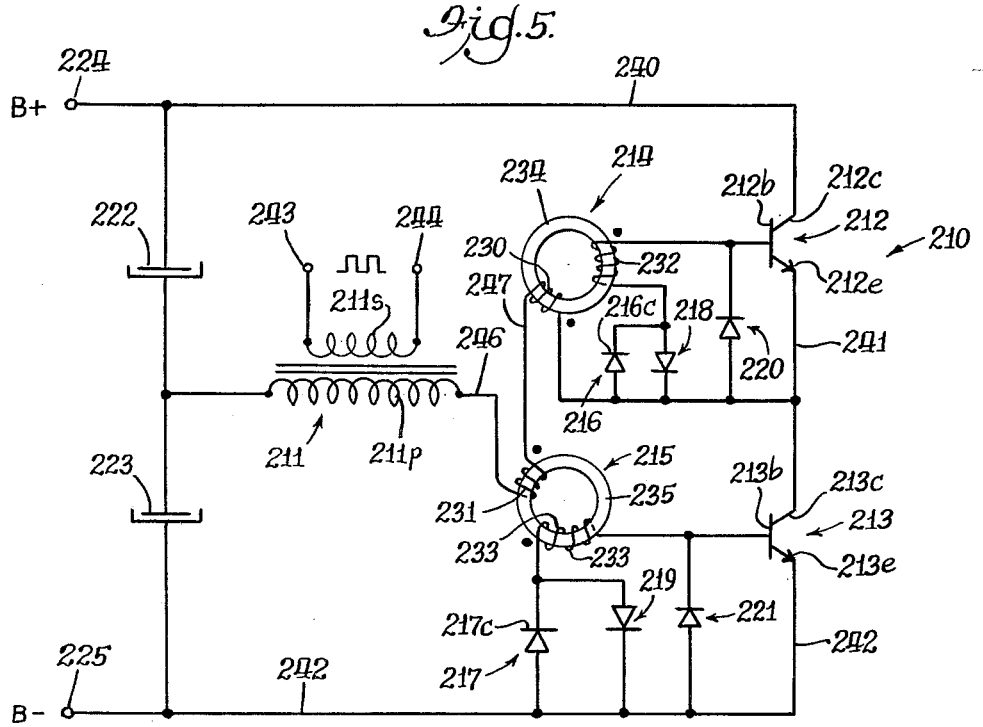
Fig. 5.

SIMPLE, HIGH-EFFICIENCY INVERTER CIRCUITS

BACKGROUND OF THE INVENTION

1. Field of the Invention

This invention relates generally to the field of electrical energy conversion systems and more particularly to push-pull inverter circuits utilizing a solid state active element oscillator of the multivibrator type to convert an input DC voltage to a high frequency AC output voltage.

2. Description of the Prior Art

Push-pull inverter circuits are generally recognized as the most efficient type for converting DC voltage into an AC output voltage. Such circuits typically include a source of DC potential, an output transformer, and a pair of switching transistors connected to control the flow of current through the output transformer for thereby producing an AC voltage output across the transformer. Efficient conversion of the DC voltage into the AC output voltage requires that the conduction of the switching transistors be precisely controlled. Such precise control can serve to minimize undesirable energy losses within the circuit itself. Some of the causes of such energy losses have been recognized and are generally regarded as inherent in such circuits, or in the components making up such circuits. Some of these losses are:

1. Common-mode conduction which occurs when both of the switching transistors conduct simultaneously. This loss is usually related to the inherent and generally unavoidable delay associated with the turn-off action of the conducting transistor, coupled with the fact that there generally is no corresponding delay associated with the turning on of the other transistor.

2. Turn-off transition loss which is due to the power dissipation that occurs within each transistor during its turn-off transition. To minimize this loss, it is necessary to operate each transistor near its maximum switching speed capability. This in turn requires that the charge carriers stored at the transistor base-emitter junction be evacuated as rapidly as possible.

It is also more important to prevent the collector voltage from rising significantly before the transistor has been turned off completely.

3. Premature turn-on. The energy dissipation due to this factor results from turning on a transistor before its collector voltage has been reduced to its minimum level.

4. Dissipation while turned on. Significant energy loss can result from power dissipation within each transistor during normal forward conduction. To minimize this loss, it is necessary to provide adequate but not excessive base drive corresponding to the collector current flowing at any given time. If more than just adequate base drive is provided, this drive can itself constitute a cause of excessive energy dissipation.

The causes of energy loss enumerated above and the consequent reduction in efficiency in inverter circuits have been recognized by others to a limited extent. The patent art also teaches some proposed solutions to correct for some of the identified energy losses. An example of such recognition is to be found in the patent to Hook, U.S. Pat. No. 3,913,036, issued on Oct. 14, 1975. This patent is directed to a saturable core astable multivibrator circuit for providing a square wave AC output voltage from a relatively low DC voltage power source. Hook's circuit includes two alternately conducting high power transistors for delivering an AC output voltage to a transformer. The conduction of the transistors is controlled by a base drive circuit containing a saturable core transformer and a pair of diodes each connected across the base to emitter junction of the transistors. The operation of Hook's circuit is dependent upon the transistors which are characterized as having significant parasitic junction capacitance with respect to the diodes which have relatively slow forward and reverse recovery time characteristics. The combination of these characteristics is utilized, purportedly, to effect non-conduction of one transistor before the other is switched on and thereby minimize common mode conduction and the consequent power dissipation.

A number of other inverter circuits are also described in the patent art and utilize separate drive or oscillator circuits for controlling the switching on and off of the transistors. Such drive circuits and to the total cost and can be wasteful of energy unless closely matched to the characteristics of the inverter circuit per se.

Alternative solutions to the enumerated causes of energy loss have been proposed in my pending applications entitled:

High Efficiency Push-Pull Inverters (filed Mar. 20, 1978, Ser. No. 890,586), and High Efficiency Inverter and Ballast Circuits (filed Dec. 28, 1978, Ser. No. 973,741).

SUMMARY OF THE INVENTION

It is an object of the present invention to provide an improved self-oscillating, push-pull inverter circuit effective to minimize or substantially eliminate all of the above enumerated causes of energy loss in a simple and highly cost effective circuit arrangement.

It is a more particular object to provide the circuit of the type described employing a pair of high power switching transistors and a single tiny saturable current transformer for providing a positive feed-back to control the conduction of the transistors.

It is a still more particular object to provide a circuit of the type described including a pair of special diodes connected across the base-emitter junction of the switching transistors. The special diodes required have the following characteristics:

The effective internal resistance of the diode junction must be significantly lower than that of the transistor base-emitter junction in the sense that for a given forward current, the amount of charge carriers in the diode junction must exceed the amount of the transistor base-emitter junction.

In regard to the above stated characteristics, it is not sufficient that the diodes merely have a long recovery time; rather, the effective diode internal resistance is the main determinative factor.

An additional characteristic of the diodes employed herein is that the reverse recovery time must not be excessive.

In order to minimize the effect of a relatively long reverse recovery time, it is an additional object to provide an additional pair of diodes across the collector-emitter junction of the transistors.

BRIEF DESCRIPTION OF THE DRAWINGS

FIG. 1 is a circuit diagram of the improved high efficiency inverter circuit of the present invention utilizing special diodes;

FIG. 3 is a wave form diagram of the transistor collector voltage in a case where excessive reverse recovery time is involved;

FIG. 4 is a fragmentary circuit diagram of a modification of the circuit of FIG. 1; and FIG. 5 is a circuit diagram of a modified version of the circuit of FIG. 1 designed to operate at relatively high DC potentials.

DETAILED DESCRIPTION OF THE PREFERRED EMBODIMENTS

Figure 2:
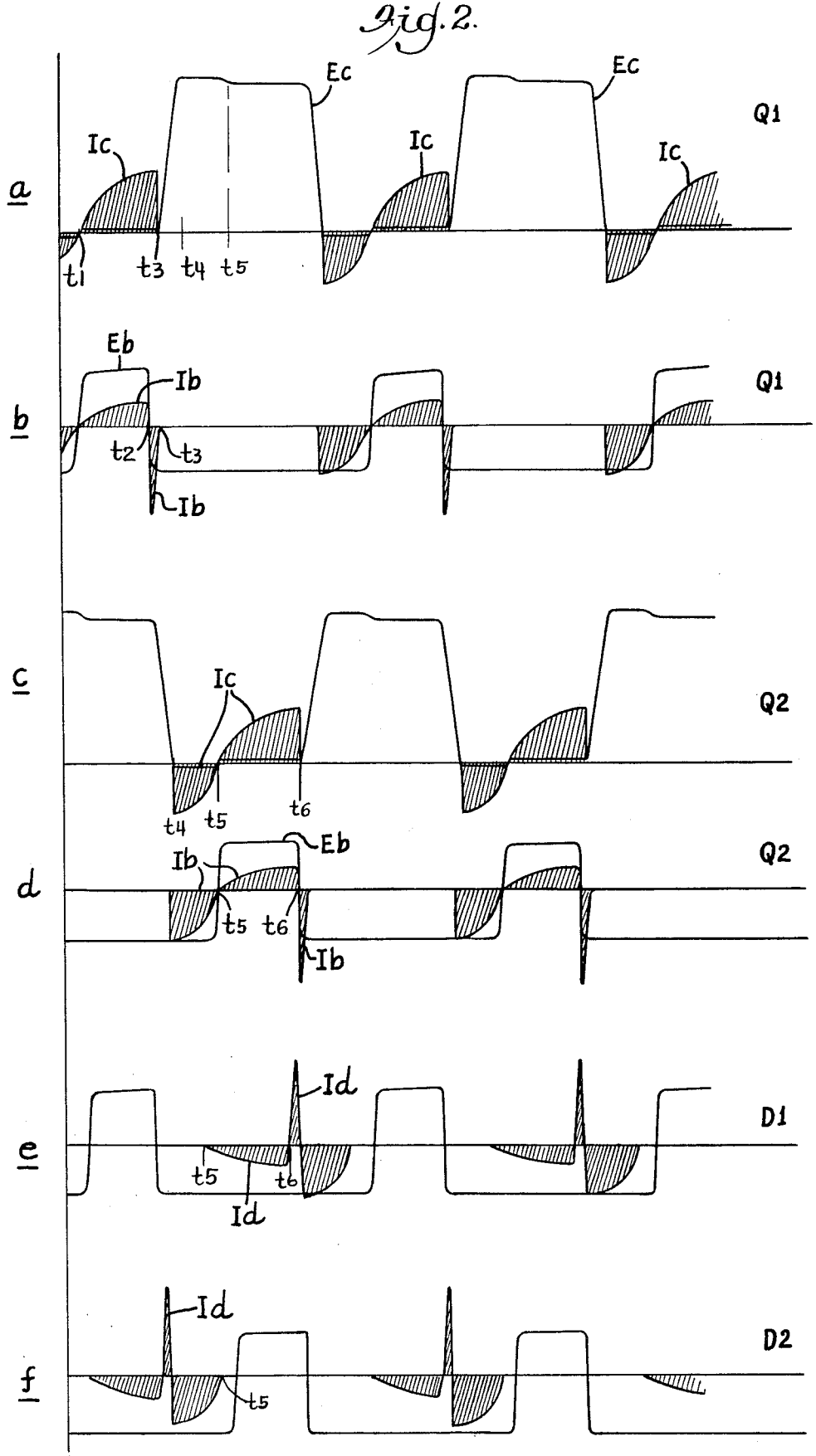
FIG. 2 is a series of wave form diagrams, matched in time, of the transistors' collector and base voltages and currents and of the diodes' voltages and currents.

The improved high efficiency inverter circuit of the present invention is illustrated schematically in FIG. 1 and is designated generally by the numeral 10. The circuit 10 comprises a main transformer 11, switching transistors 12 and 13, a saturable feed-back transformer 14, a resistor 15 and diodes 16 and 17.

The main transformer 11 has a primary winding 11p, a secondary winding 11s and a magnetic core 11c. The transistor 12 has a base 12b, a collector 12c, and an emitter 12e. Similarly, the transistor 13 has a base 13b, a collector 13c, and emitter 13e. The diodes 16 and 17 each have an anode and cathode 16a and 16c, and 17a and 17c, respectively. The feed-back transformer 14 has windings 20, 21 and 22 wound on a magnetic torroidal core 23. The main transformer secondary 11s is connected to deliver a high frequency AC voltage output to terminals 18 and 19.

The primary winding 11p has a center tap 25 connected to a B+ terminal 26. The B+ terminal 26 is also connected by a lead 27 to one end of resistor 15. The other end of resistor 15 is connected by a lead 28 to the base 12b, the cathode 16c and to one end of winding 22 of transformer 14. One end of the primary winding 11p is connected by means of a lead 30 to one end of the winding 20 on the feedback transformer 14. The other end of winding 20 is connected by means of a lead 32 to the collector 12c. The other end of the primary winding 11p is connected by means of a lead 31 to one end of the winding 21 of the transformer 14. The other end of winding 21 is connected by means of a lead 33 to the collector 13c. One end of winding 22 is connected to the base 12b as previously described, the other end of winding 22 is connected by lead 35 to the base 13b of transistor 13 and to the cathode 17c of diode 17. The emitter 12e and anode 16a of diode 16 are connected by a lead 36 to a B− terminal 40. Similarly, the emitter 13e and anode 17a are connected by a lead 37 to the B− terminal 40.

Referring now to FIGS. 1 and 2, the operation of the circuit 10 may be described as follows:

A positive starting signal is supplied through the resistor 15 to the base 12b and assume this transistor 12 is triggered into conduction as shown at time $t_1$ on the wave form a of FIG. 2. Collector current $I_c$ then flows from B+ through one-half of the winding 11p, lead 30, winding 20 on transformer 14, the lead 32, collector 12c, and emitter 12e to B−. Changing flux in the core 23 of transformer 14 induces a current in the coil 22 which provides a positive feedback signal until time $t_2$ to the base 12b ($E_b$ of FIG. 2b). The complete circuit path for the base $I_b$ current is through the emitter 12e and through leads 36 and 37 and diode 17 back to the other end of winding 22. The base current $I_b$ fed back to the base 12b is substantially proportional to the collector current $I_c$ until the core 23 saturates at time $t_2$. When this occurs, the voltage across the winding 22 drops to zero and this winding in effect becomes a short circuit between the base 12b and the cathode 17c of diode 17 along with the base 13b of transistor 13.

Just prior to saturation, the base voltage $E_b$ on 12b may have a magnitude of, for example, +0.75 volts. Correspondingly, the potential at the base 13b and at the cathode 17c may have a magnitude of approximately −0.75 volts. The positive signal fed to the base 12b produced an accumulation of charge carriers at the base-emitter junction. Similarly, the cathode 17c is negatively charged as the junction of the diode 17 is stocked with charge carriers. The critical feature characterizing invention occurs precisely at this point in time when the winding 22 presents a short circuit between the positively charged base 12b and the negatively charged cathode 17c. The performance of the circuit 10 at this point depends upon which of these two potentials shall prevail. If the positive voltage on the base 12b were to prevail, the base 13b would be driven positive and the transistor 13 would begin to conduct. This would mean that transistors 12 and 13 would be conducting simultaneously for a short period of time. This is specifically one of the energy dissipative factors intended to be eliminated by the present invention. However, because of the particular characteristics of the diode 17, the negative potential at the cathode 17c prevails so that the base 12b is driven negative and rapidly exhausted of its charge carriers, thereby rapidly turning off the transistor 12 without turning on transistor 13. The collector current drops to zero at time $t_3$.

During this time span, from $t_2$ to $t_3$, the current $I_b$ is shown in FIG. 2b as a sharp negative spike corresponding to the rapid evacuation of charge carriers from the base 12b. This sharp negative current is matched by a sharp positive conduction $I_d$ through the diode 17 as shown in FIG. 2f.

As the transistor 12 is turned off, it in effect becomes an open switch for forward conduction. The leakage inductance of the transformer 11 causes the current to continue to flow in the same direction and causes the voltage at the collector 12c to rise. As the voltage of 12c rises, the voltage at the other end of the transformer 11 and at the collector 13c falls, eventually to be clamped slightly negative. The collector voltage of transistor 12 is clamped at a maximum at time $t_4$. The rate of rise of collector voltage between the times $t_3$ and $t_4$ can be restrained by the charging of a capacitor 50 connected between the collectors 12c and 13c.

Continuing with a description of the cycle of operation, at time $t_4$ the collector 13c is driven slightly negative and a negative current ($I_c$ in FIG. 2c) and ($I_b$ in FIG. 2d) flows between the base 13b and collector 13c. The path for this current flow is from B− through diode 17, the base-collector junction of transistor 13, winding 21 on transformer 14 and the right half of winding 11p to B+. This negative current thus effectively returns to the power supply most of the reactive energy stored in the leakage inductance of transformer 11.

At time $t_5$ the base 13b is driven positive (FIG. 2d) and a positive collector current $I_c$ (FIG. 2c) begins to flow between the collector 13c and emitter 13e. The complete path for this current flow is from B+ through the right half of transformer winding 11p, winding 21 on transformer 14, collector 13c and emitter 13e to B−. The collector current $I_c$ flowing through winding 21 induces a positive feedback signal $E_b$ in winding 22 which is supplied to base 13b as shown in FIG. 2d. The complete path for the base current $I_b$ is from the winding 22 through the base-emitter junction of transistor 13, leads 37 and 36 through diode 16 back to winding 22. The positive base current $I_b$ of transistor 13 is matched by a negative current $I_d$ through diode 16, as shown in FIG. 2e.

The collector current $I_c$ and base current $I_b$ increase until time $t_6$ when the transformer core 23 again saturates. The winding 22 again becomes substantially a short circuit between base 13b and cathode 16c. The negative voltage at cathode 16c prevails over the positive voltage $E_b$ at base 13b and the base 13b is driven negative shutting off the forward conduction of transistor 13 at time $t_7$. The rapid evacuation of charge carriers from the base 13b is shown as a sharp negative spike $I_b$ between times $t_6$ and $t_7$ in FIG. 2d. This sharp negative current is matched by a positive spike $I_d$ for diode 16 (FIG. 2e). The collector voltage $E_c$ on transistor 13 begins to rise until time $t_8$ and the collector voltage on transistor 12 declines correspondingly, completing the cycle.

In order for the circuit to perform as just described, it is important that the effective internal resistance of diode 17 be significantly lower than that of the base-emitter junction of transistor 12. The lower resistance provides an easier evacuation path for the charge carriers. Also, for a given forward current it is necessary for the amount of charge carriers stored in the diode 17 junction to exceed that stored in the transistor 12 base-emitter junction; i.e. the negative charge on diode 17 has to do more than just balance the positive charge on transistor 12. Finally, the recombination time of the charge carriers in the diode 17 junction has to be at least as long as that of the charge carriers in the transistor 12 base-emitter junction.

The conditions just described apply in the same manner for transistor 13 and diode 16.

These criteria establish that it is not sufficient merely to use diodes with a long recovery time; rather, the internal resistance of the diodes 16 and 17 and the amount of charge stored are more determinative.

The importance of relative internal resistance and the magnitude of charges stored is apparent from the above description. The significance of recombination time is not so apparent and has been determined by empirical evidence. It is not enough merely to use diodes with a long recovery time, as suggested in the patent to Hook, U.S. Pat. No. 3,913,036. Moreover, it is important that the recombination time (or the reverse recovery time) not be excessive. If this recovery time is too long, there may be interference in the process of turning on the transistors. Where excessive reverse recovery time is present, the transistor collector voltage may take a pattern as shown in the wave form diagram of FIG. 3. Such a conduction pattern as shown results in significant and unnecessary device dissipation.

The effect of excessive recovery time can be obviated by the addition of two extra diodes to the circuit of FIG. 1. The diodes are connected as shown in the partial circuit of FIG. 4. This circuit is designated generally by the numeral 110 and comprises transistors 112 and 113, a saturable current transformer 114, special diodes 116 and 117. The transformer 114 has a winding 122 on a core 123 which is connected to the bases of the transistors. The special diodes 116 and 117 are connected across the base-emitter junctions of transistors 112 and 113, respectively, as previously described for FIG. 1. The additional diodes 150 and 151 are connected across the collector-emitter junctions of the transistors 112 and 113, respectively. The cathodes 150c and 151c of these shunting diodes are connected to the collectors of the respective transistors.

In operation, this modified circuit of FIG. 4 functions as follows: when the collector of the off transistor 112 or 113 is driven negative by the leakage inductance of the main transformer, as previously described, the shunting diode 150 or 151 provides a lower impedance path for the reverse current flow than the series connection of transistor and associated special diode 117 or 116. Since the reverse current flow does not now flow through the special diode, it will not have accumulated a large amount of charge carriers that have to be swept clean before the cathode voltage can attain a positive level.

Referring now to FIG. 5, there is illustrated a circuit designed for operation at relatively high DC potentials. The circuit is designated generally by the numeral 210 and comprises a main transformer 211, switching transistors 212 and 213, and saturable feed-back transformers 214 and 215. The circuit 210 also includes special diodes 216 and 217, additional diodes 218, 219, 220 and 221, and two capacitors 222 and 223 connected in series between B+ terminal 224 and B− terminal 225. The transformer 214 has windings 230 and 232 on a magnetic core 234, and the transformer 215 has windings 231 and 233 on a magnetic core 235.

The collector of transistor 212 is connected by means of a lead 240 to B+. The emitter 212e of transistor 212 is connected to the collector 213c of transistor 213 by means of a lead 241. The emitter 213e of transistor 213 is connected by a lead 242 to the B− terminal 225. The transformer 211 has a secondary winding 211s connected to deliver a high frequency AC output voltage to a pair of outlet terminals 243 and 244. The transformer 211 also has a primary winding 211p, one end of which is connected to a junction 245 between the capacitors 222 and 223. The other end of the primary winding 211p is connected by a lead 246 to one end of the winding 231 of the saturable feedback transformer 215. The other end of the winding 231 is connected by means of a lead 247 to one end of winding 230 of the transformer 214. The other end of winding 230 is connected to the lead 241. The diodes 216 and 218 are connected in parallel opposition with the anode of 216 and the cathode of 218 being connected to the lead 241. The cathode of 216 and the anode of 218 are connected to one end of the winding 232 of the transformer 214. The other end of the winding 232 is connected to the base 212b of transistor 212. The diode 220 is connected across the base-emitter junction of transistor 212 with the cathode of 220 being connected to the base of transistor 212 and the anode being connected to lead 241. Similarly, the diodes 217 and 219 are connected in parallel opposition with the anode of 217 and the cathode of 219 being connected directly to the B− lead 242, and the cathode of 217 and anode of 219 being connected to one end of the winding 233 of the feedback transformer 215. The other end of winding 233 is connected to the base 213b of the transistor 213. The diode 221 is connected across the base-emitter junction of transistor 213, the cathode of 221 being connected to the base 213b and the anode being connected to the B— lead 242.

In operation, the circuit of FIG. 5 functions as follows:

The total DC potential between B+ and B— is applied across the series connection of capacitors 222 and 223. The capacitors 222 and 223 may be electrolytic, although other types of voltage dividers may work as well, and the voltage may be equally divided so that the voltage at the junction 245 is one-half of the total DC potential. The total DC potential is also applied across the series connection of transistors 212 and 213.

At some point in time, the transistor 212 is conducting and current flows from B+ through the collector-emitter junction, lead 241, windings 230, 231 and winding 211p to the junction 245, and through capacitor 222 back to B+. The direction of this current through the main transformer winding 211p is to the left as shown in FIG. 5. The current through winding 230 of transformer 214 induces a positive feedback signal in winding 232 which is fed to the base of transistor 212. This signal produces an accumulation of positive charge carriers at the base-emitter junction of transistor 212 and maintains it in a state of conduction. The complete path for this base drive current from winding 232 is through the base-emitter junction, lead 241, and diode 216 back to winding 232. This base drive current also causes an accumulation of negative charge carriers across the diode 216 junction.

The collector current increases through winding 230 and at some time the transformer core 234 saturates. When this occurs, the winding 232 becomes an effective short circuit between the positively charged base 212b and the negatively charged cathode 216c. As previously described, because of the special diode characteristics, the voltage at cathode 216c prevails, the positive charge carriers at base 212b are rapidly evacuated through diode 218 and transistor 212 is shut off. The leakage inductance of transformer 211 provides an effective inertia for causing the collector current flow in the same direction. The voltage at collector 212c rises to B+ and the voltage at collector 213c drops.

At some point the inductive energy of transformer 211 is exhausted and transistor 213 begins to conduct. In this case, the direction of current flow is from the junction 245 through winding 211p, windings 231 and 230, and the collector-emitter junction of transistor 213 to lead 242. The return path from lead 242 is through capacitor 223 to the junction 245. Current flow through winding 231 induces a positive feedback signal in winding 233 which is fed to the base 213b maintaining transistor 213 in a state of conduction. It is to be noted that the direction of current through winding 211p is now to the right as shown in FIG. 5. (Opposite to the direction of current flow when transistor 212 was conducting.) The signal supplied from winding 233 stores positive charge carriers at the base 213b and negative charges at the junction of diode 217. The transformer 215 saturates at some point making the winding 233 substantially a short circuit between the positively charged base 213b and the negative cathode 217c. Again the negative diode voltage prevails and the base 213b is rapidly evacuated of its charge carriers through diode 219 and the transistor 213 is cut off. Transistor 212 is again triggered into conduction and the cycle is complete.

The alternating conduction of the transistors 212 and 213 thus controls the alternating direction of current flow through primary winding 211p of main transformer 211. This alternating current through winding 211p is delivered as a high frequency alternating voltage at the secondary winding 211s.

It is to be understood that the embodiments shown and described are by way of example only and that many changes may be made thereto without departing from the spirit of the invention. The invention is not to be considered as limited to the embodiments shown and described except insofar as the claims may be so limited.

Glossary of Terminology

1. Leakage inductance, as defined herein, shall mean an effective shunt or parallel inductance as typically obtained by providing an air gap in the magnetic path of the transformer.

2. The collector-emitter saturation voltage is a condition where there is adequate base current to correspond to the collector current so that additional base current will not substantially decrease the collector-emitter voltage. The collector voltage, as described herein, is referenced to the emitter.

3. Internal resistance as defined herein refers to the transient resistance of the base-emitter junction of each transistor while charge carriers are being evacuated therefrom. Similarly, the internal resistance of the diodes is the resistance that exists in each diode during the charge evacuation period of its related transistor.

What is claimed is:

1. In an inverter circuit for converting DC voltage into AC voltage a drive circuit having a pair of alternating conducting switching transistors, each with a collector and a base-emitter junction and characterized by some internal resistance, and comprising:

feedback control means including a saturable current transformer having one winding connected directly between the base-emitter junctions of the transistors and operable to provide intermittent drive signals to the transistors for turning them on alternately; and diode means connected across the base-emitter junction of each transistor and characterized by internal resistance less than that of the associated transistors and operable to affect the rapid turning off of a conducting transistor for thereby producing an alternating output voltage.

2. In the inverter circuit of claim 1 wherein:

said diode means are additionally characterized by charge carrier storage capacity greater than that of the associated transistors for a given forward current through a conducting transistor.

3. In the inverter circuit of claim 1 wherein:

said diode means are additionally characterized by charge carrier recombination time in the diode junctions at least as long as that in the transistor base-emitter junctions.

4. A control circuit for an electrical inverter having a pair of switching transistors, each with a base-emitter junction and characterized by some internal resistance, and adapted to convert DC voltage supplied from a DC source into a high-frequency AC output voltage comprising:

feedback means connected to the base-emitter junctions and operable to supply intermittent signals for controlling the alternating conduction of the transistors and operable to produce an accumulation of charge carriers of one polarity at the base-emitter junctions; and diode means also connected to the base-emitter junctions and operable to store charge carriers of an opposite polarity and effective intermittently to overcome the influence of the charge carriers stored at the base-emitter junction for thereby turning off the transistors.

5. The control circuit of claim 4 wherein:
said feedback means includes a saturable current transformer having one winding connected directly between the base-emitter junctions.

6. The control circuit of claim 5 wherein:
upon saturation of said current transformer, said one winding provides a direct connection between a base-emitter junction charged with carriers of one polarity to a diode junction charged with carriers of an opposite polarity.

7. The control circuit of claim 4 wherein:
said diode means are characterized by internal resistance less than that of the transistor base-emitter junctions.

8. The control circuit of claim 4 wherein:
the amount of charge carriers stored by said diode means is at least as great as that stored by the base-emitter junctions.

9. The control circuit of claim 4 wherein:
said diode means are additionally characterized by an amount of charge carriers stored at a diode junction at least as great as that stored by the base-emitter junctions.

10. An electrical inverter circuit having a pair of alternately conducting switching transistors, each having a collector, and a base-emitter junction and characterized by some internal resistance through the base-emitter junction for a forward conduction mode and comprising:
feedback control means connected to the base-emitter junctions and operable to supply intermittent signals for turning on a non-conducting transistor; and
diode control means connected across the base-emitter junctions of the transistors and characterized by internal resistance less than that of the transistors and operable to affect the rapid turning off of a conducting transistor for thereby producing an alternating output voltage.

11. The inverter circuit of claim 10 wherein:
said feedback control means includes a saturable current transformer having one winding connected directly between the base-emitter junctions.

12. The inverter circuit of claim 10 wherein:
said diode control means are additionally characterized by charge carrier storage capacity greater than that of the transistor base-emitter junctions for a given forward current through a conducting transistor.

13. The inverter circuit of claim 12 wherein:
said diode control means are additionally characterized by a recombination time of charge carriers stored therein at least as long as the recombination time of charge carriers stored in the transistor base-emitter junctions.

14. The inverter circuit of claim 11 wherein:
said diode control means is operable to supply a subtractive feedback signal upon saturation of said saturable transformer for thereby rapidly turning off a conducting transistor.

15. The inverter circuit of claim 14 including:
an output transformer having some leakage inductance connected between the collectors of the transistors and operable to produce cyclical voltage rises and declines at the collectors; and
a capacitor also connected directly between the collectors of the transistors and operable to limit the rate of voltage rise and decline at the collectors.

16. The inverter circuit of claim 15 wherein:
said saturable transformer has at least one input winding connected between said capacitor and said output transformer.

17. The inverter circuit of claim 16 including:
additional diode means connected between the collector and emitter of each transistor and operable to provide a low impedance path for negative current flow when the collector of the respective transistor is driven negative due to the influence of the leakage inductance of said output transformer.

18. An electrical inverter circuit having a pair of alternately conducting switching transistors, each having a collector and base-emitter junction and characterized by some internal resistance and operable to provide an AC output voltage from a DC source having a pair of output terminals comprising:
a voltage dividing network connected across said terminals;
a series connection of the transistors in parallel with said voltage dividing network; and
drive control means including a diode connected across the base-emitter junction of each transistor with each of said diodes being characterized by an internal resistance less than that of an associated transistor.

19. The inverter circuit of claim 18 wherein:
said drive control means includes a saturable current transformer connected to the base-emitter junctions of both transistors and operable to provide intermittent control signals for alternately switching on the transistors.

20. The inverter circuit of claim 19 wherein:
said diodes are operable upon saturation of said current transformer to provide a subtractive signal to the base-emitter junction of a conducting transistor for rapidly turning it off.

21. The inverter circuit of claim 20 including:
a power output transformer having some leakage inductance connected between a series junction point of said transistors and an intermediate point on said voltage dividing network for delivering an AC output voltage produced by the alternate conduction of the transistors.

22. A drive control circuit for an electral inverter adapted to convert DC voltage from a DC source having a positive terminal and a negative terminal into high frequency AC voltage through an output transformer connected to the positive DC terminal and having an input winding with two ends and comprising:
a pair of switching transistors, each having a collector and a base-emitter junction and characterized by some internal resistance through said junction;
a pair of diodes, one connected across said base-emitter junction of each transistor and characterized by internal resistance less than that of said transistor;
a saturable current transformer having a first winding connected directly between said base-emitter junctions, a second winding connected between said collector of one transistor and a first lead adapted to be connected to one end of the output transformer winding, and a third winding connected between said collector of the other transistor and a second lead adapted to be connected to the other end of the output transformer winding;

a capacitor connected directly between said collectors; and a third lead connected to said base-emitter junctions and adapted to be connected to the negative DC terminal.

23. An electrical inverter circuit adapted to convert DC voltage into AC voltage comprising:

a pair of alternately conducting switching transistors, each having a collector and a base-emitter junction; and a saturable current transformer having one winding connected directly between the base-emitter junctions of said transistors to produce an effective short circuit therebetween upon saturation and operable to provide feedback signals for controlling the alternating conduction of said transistors.

24. The inverter circuit of claim 23 including:

a diode connected across the base-emitter junction of each transistor for additionally controlling the conduction of said transistors.

25. The inverter circuit of claim 24 wherein:

said transistors are characterized by some internal resistance in their base-emitter junctions; and said diodes are also characterized by internal resistance less than that of said transistors.

26. The inverter circuit of claim 25 wherein:

said transistors are additionally characterized by some charge carrier storage capacity in their base-emitter junctions; and said diodes are also characterized by charge storage capacity greater than that of said transistors.

* * * * *